(12) United States Patent
Yoshida

(10) Patent No.: US 7,969,063 B2
(45) Date of Patent: Jun. 28, 2011

(54) DRIVER

(75) Inventor: Ryuichi Yoshida, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 118 days.

(21) Appl. No.: 12/524,201

(22) PCT Filed: Jan. 7, 2008

(86) PCT No.: PCT/JP2008/050020
§ 371 (c)(1),
(2), (4) Date: Jul. 23, 2009

(87) PCT Pub. No.: WO2008/096554
PCT Pub. Date: Aug. 14, 2008

(65) Prior Publication Data
US 2010/0026139 A1 Feb. 4, 2010

(30) Foreign Application Priority Data

Feb. 9, 2007 (JP) .................................. 2007-030611

(51) Int. Cl.
H02N 2/06 (2006.01)
H01L 41/09 (2006.01)
(52) U.S. Cl. ..................... 310/316.03; 310/315; 310/317
(58) Field of Classification Search .................. 310/315, 310/316.03, 317
See application file for complete search history.

(56) References Cited

U.S. PATENT DOCUMENTS

| 5,204,576 A * | 4/1993 | Mitsuyasu | 310/317 |
| 6,218,765 B1* | 4/2001 | Kawabe | 310/317 |
| 6,528,925 B1* | 3/2003 | Takeuchi et al. | 310/316.03 |
| 6,844,658 B2* | 1/2005 | Hoshino | 310/316.03 |
| 6,876,126 B2* | 4/2005 | Okada | 310/317 |
| 7,298,100 B2* | 11/2007 | Kataoka | 318/114 |
| 7,705,516 B2* | 4/2010 | Yoshida et al. | 310/316.03 |
| 2002/0117939 A1* | 8/2002 | Kawamoto | 310/316.03 |

FOREIGN PATENT DOCUMENTS

| JP | 57-103854 | * 6/1982 | ................ 310/315 |
| JP | 4-208080 A | 7/1992 | |
| JP | 8-294288 A | 11/1996 | |
| JP | 2001-211669 A | 8/2001 | |
| JP | 2001-268951 A | 9/2001 | |
| WO | WO 2008/096554 A1 | 8/2008 | |

* cited by examiner

Primary Examiner — Thomas M Dougherty
(74) Attorney, Agent, or Firm — Sidley Austin LLP

(57) ABSTRACT

A driver, including: a piezoelectric element extending and contracting upon application of an electrical voltage; a driving member having one end secured to the piezoelectric element; a frictionally coupling member, frictionally coupling the driving member; and a drive circuit, connected with a power supply to activate the piezoelectric element at a predetermined period, including: a charge switching element for connecting an electrode of the piezoelectric element with the power supply, a discharge switching element, and a protective resistor arranged in an electric path between the power supply and the piezoelectric element or between the piezoelectric element and a ground point, wherein a resistance value of the protective resistor is set larger than an ON resistance of the switching element but smaller than a value obtained by dividing one half of the drive period of the switching element by a capacitance of the piezoelectric element, in a predetermined period.

5 Claims, 2 Drawing Sheets

DRIVER

RELATED APPLICATIONS

This application is a National Stage of International Application No. PCT/JP2008/050020, filed with the Japanese Patent Office on Jan. 7, 2008, which claims priority to Japanese Patent Application No. 2007-030611, filed Feb. 9, 2007.

FIELD OF THE INVENTION

The present invention relates to a driver employing a friction drive method using a piezoelectric element.

BACKGROUND TECHNOLOGY

The driver employing the friction drive method is well known, in which a driving member, formed of a shaft, is non symmetrically reciprocated in its axial direction by the piezoelectric element, whereby a frictionally coupling member, engaging the driving member, and the driving member are caused to slide as a relative movement (there are two cases, one is the frictionally coupling member is moved, the other is the driving member is moved).

Concerning said driver employing the friction drive method, a drive circuit is necessary to be used so that periodically changing voltages are applied to the piezoelectric element. As the drive circuit, an electrode receives the electrical voltages, or is grounded by a semiconductor switching element, whereby the drive circuit applies the electrical voltages, as rectangular waves, to the piezoelectric element.

For example, in Patent Document 1, a drive circuit employing a half-bridge circuit, is disclosed. That is, one electrode of the piezoelectric element is always grounded, and a switching element is configured to connect a power supply to the other electrode. Further, another switching element is configured to connect the ground to the above other electrode. Further, in Patent Document 2, a full-bridge circuit is disclosed, that is, both electrodes of the piezoelectric element are alternately connected to the power supply, and the remaining electrode, not being connected to the power supply during the above alternative connection, is grounded, so that the polarity of the electric voltage, to be applied to the piezoelectric element, is reversed.

The piezoelectric element is a capacitor as the electrical category, more precisely, the piezoelectric element includes a resistor element, which generates adverse heat while charging and discharging operation. Accordingly, when the drivers, employing the above conventional methods, are continuously operated, adverse problems occur. That is, after continuous operation, the temperature of the piezoelectric element increases, so that adhering force is reduced to connect the piezoelectric element with a spindle to fix the driving member or the piezoelectric element, which results in an adverse affect on the mechanical structure. Further, the temperature of the piezoelectric element reaches Curie temperature, so that a extending and contracting function is deteriorated, whereby the function of the piezoelectric element decreases. Yet further, the switching elements overheat due to charging and discharging electrical current.

Patent Document 1: Unexamined Japanese Patent Application Publication No. 2001-268,951

Patent Document 2: Unexamined Japanese Patent Application Publication No. 2001-211,669

DISCLOSURE OF THE INVENTION

Problem to be Solved by the Invention

Regarding the above problems, the problem of the present invention is to offer the driver, employing the friction drive method, in which heat generation is reduced, which tends to occur in the piezoelectric element and the switching elements.

Means to Solve the Problems

In order to overcome the above problem, the driver of the present invention includes: a piezoelectric element, extending and contracting upon application of an electrical voltage; a driving member, having one end secured to the piezoelectric element and being able to reciprocate in an axial direction by the extending and contracting movement of the piezoelectric element; a frictionally coupling member, frictionally coupling the driving member and being caused to slide against the driving member by reciprocating movement of the driving member; and a drive circuit, connected with a power supply and applying a voltage generated by the power supply to the piezoelectric element at a predetermined drive period, wherein the drive circuit includes: a charge switching element, for connecting an electrode of the piezoelectric element with the power supply, a discharge switching element, for grounding the electrode of the piezoelectric element, and a protective resistor, arranged in at least either an electric path between the power supply and the piezoelectric element or an electric path between the piezoelectric element and a ground point, wherein the resistance of the protective resistor is set larger than an ON resistance of the switching element but smaller than a value, obtained by dividing one half of the drive period of the switching element by a capacitance of the piezoelectric element.

Based on the above structure, the protective resistors are arranged in the electric path to charge the piezoelectric element, as well as in the electric path to discharge the piezoelectric element, whereby the electric currents for charging and discharging are lowered within a scope in which the driver does not lose its driving force, so that energy accumulated in the piezoelectric element is appropriately used in the protective resistors. That is, the heat generation occurred in inner resistance of the piezoelectric element and in switching elements can be reduced.

Further, in the driver of the present invention, said drive circuit may be the full-bridge circuit, by which the voltage generated in said power supply is supplied to an appropriately selected electrode of said piezoelectric element. Still further, since said protective resistor may be arranged either between said charge switching element and said piezoelectric element, or between said discharge switching element and said piezoelectric element, even when both electrodes of said piezoelectric element are short-circuited, appropriate energies of charging and discharging currents are used in said protective resistor, so that the heat generation in said piezoelectric element can be reduced.

EFFECT OF THE INVENTION

Based on the present invention, the energy accumulated in the piezoelectric element is appropriately used in the protective resistor, so that any heat generated in the piezoelectric element and the switching element can be reduced.

Figure 1:
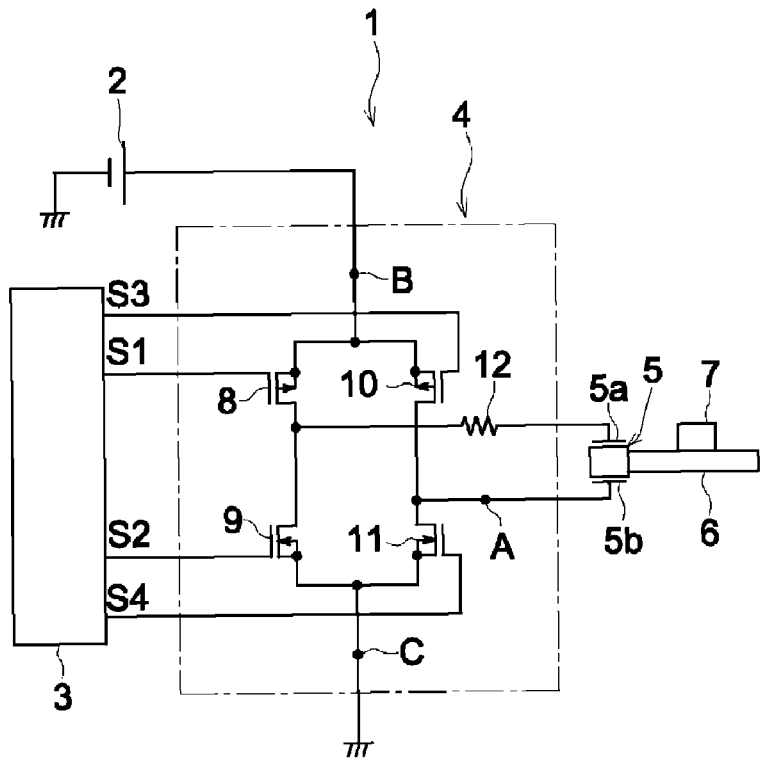
FIG. 1 is a circuit diagram of the driver of a First Embodiment of the present invention.

EXPLANATION OF THE NUMERALS 1 driver
2 power supply
3 control circuit
4 drive circuit
5 piezoelectric element
5a, 5b electrode
6 driving member
7 frictionally coupling member
8 transistor (serving as a charge switching element)
9 transistor (serving as a discharge switching element)
10 transistor (serving as a charge switching element)
11 transistor (serving as a discharge switching element)
12 protective resistor

DETAILED DESCRIPTION OF THE PREFERRED EMBODIMENTS

The Embodiments of the present invention will now be detailed while referring to the drawings.

FIG. 1 shows a structure of driver 1 of the First Embodiment of the present invention, which includes; drive circuit 4, connected to direct current power supply 2 to supply voltage Vp(V) and to control circuit 3; piezoelectric element 5 whose electrodes 5a and 5b receive output signals from the drive circuit; shaft-shaped driving member 6 one end of which is secured to piezoelectric element 5; and frictionally coupling member 7, engaged with driving member 6 by frictional force.

Piezoelectric element 5 is configured to telescope in its axial direction of driving member 6, upon electrical voltages applied on electrodes 5a and 5b. When piezoelectric element 5 is energized to telescope, driving member 6 reciprocates in its axial direction. If driving member 6 moves slowly, frictionally coupling member 7 engages to move with driving member 6. If driving member 6 moves quickly, frictionally coupling member 7 is forced to stay at its position due to the inertial force, so that frictionally coupling member 7 slides on driving member 6.

Drive circuit 4 includes transistors 8, 9, 10, and 11, being activated or deactivated by control signals S1, S2, S3 and S4 respectively, and protective resistor 12. Transistor 8 serves as a charge switching element, being a p-channel field-effect transistor, and when transistor 8 is activated, transistor 8 applies the electrical voltage of power supply 2 on electrode 5a of piezoelectric element 5 through protective resistor 12. Transistor 9 serves as a discharge switching element, being an n-channel field-effect transistor, and when transistor 9 is activated, transistor 9 connects electrode 5a of piezoelectric element 5 to ground through protective resistor 12. Transistor 10 serves as a charge switching element, being a p-channel field-effect transistor, and when transistor 10 is activated, transistor 10 applies the electrical voltage of power supply 2 on electrode 5b of piezoelectric element 5. Transistor 11 serves as a discharge switching element, being an n-channel field-effect transistor, and when transistor 11 is activated, transistor 11 connects electrode 5b of piezoelectric element 5 to ground.

Control circuit 3 outputs periodic rectangular control signals S1, S2, S3 and S4, to drive transistors 8, 9, 10, and 11 respectively, wherein control signal S1 includes the same wave form as that of control signal S2, while control signal S3 and control signal S4 represent inverted signals to counter control signal S1 and control signal S2. Due to these structures, control circuit 3 controls drive circuit 4 so that transistor 8 and transistor 11 are simultaneously activated, and when control transistor 8 and transistor 11 are simultaneously deactivated, transistor 9 and transistor 10 are simultaneously activated. That is, drive circuit 4 applies electrical voltage Vp(V) of power supply 2 on any one of electrodes 5a and 5b of piezoelectric element 5, while drive circuit 4 connects the other electrode 5a or 5b to ground, so that drive circuit 4 alternately applies electrical voltage Vp(V) on electrodes 5a and 5b, being a so-called full-bridge circuit.

Assuming, for example, that the driving period of control signals S1, S2, S3 and S4, is T sec., transistors 8 and 10 are controlled to repeat at an activated interval of 0.7 sec. and at a deactivated interval of 0.3 sec., while transistors 9 and 11 are controlled to repeat at a deactivated interval of 0.7 sec. and at an activated interval of 0.3 sec. Due to these operations, positive Vp(V) of 0.7 sec. and negative Vp(V) of 0.3 sec. are repeatedly applied between electrodes 5a and 5b of piezoelectric element 5. In this case, due to the mechanical delays of piezoelectric element 5 and driving member 6, an ejecting speed of driving member 6 which is forced to be ejected by piezoelectric element 5 in an ejection direction differs from the pulling back speed of driving member 6 which is forced to be pulled back by piezoelectric element 5 in a pulling back direction, whereby frictionally coupling member 7 is driven to slide in only one direction on driving member 6.

The ratio of the active intervals of transistors 8 and 11 (being the so called duty ratio) is configured to be changeable, based on the speed for moving frictionally coupling member 7, whereby when the output interval ratios between control signals S1 and S2, and control signals S3 and S4 are interchanged, the sliding direction of frictionally coupling member 7 can be reversed.

Figure 2:
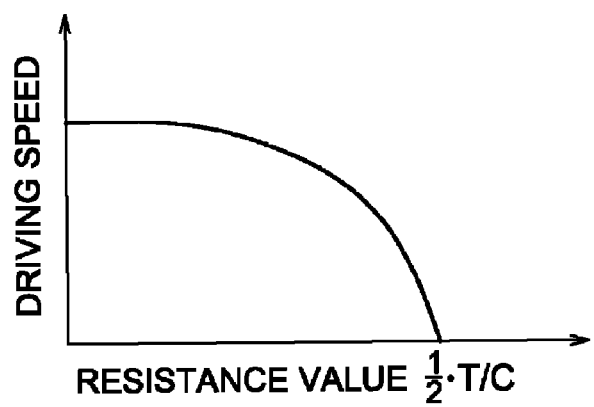
FIG. 2 is a graph to show the relationship between the protective resistor and driving speed of the driver shown in FIG. 1.

While not changing the duty ratio, if resistance value R(Ω) of protective resistor 12 is changed, the driving speed of frictionally coupling member 7 also changes, which is shown in FIG. 2. When resistance value R of protective resistor 12 is relatively small, the driving speed of frictionally coupling member 7 is barely affected by the change of resistance value R, however, when resistance value R becomes great, the driving speed of frictionally coupling member 7 is greatly reduced, and specifically, when resistance value R becomes greater than the value obtained by dividing one half of drive period T by capacitance C(F) of piezoelectric element 5, frictionally coupling member 7 becomes deactivated.

Because, when time constant RC of an RC circuit, structured of capacitance C (70 nF, for example) of piezoelectric element 5 and protective resistance R, becomes greater than the time which can be used by frictionally coupling member 7 to slide against the driving member, that is one half of drive period T (sec.) (which is 3.57μ sec. at drive period 140 kHz, for example), insufficient energy is supplied on piezoelectric element 5. More strictly, said time constant is further related to inner resistance rc (0.5Ω, for example) of piezoelectric element 5, ON-resistors r1 (0.7Ω, for example) of transistors 8 and 10, which are the p-channel field-effect transistors, and to ON-resistors r2 (0.3Ω, for example) of transistors 9 and 11, which are the n-channel field-effect transistors. However, at such a critical driving point, resistance value R (which is, for example, approximately 50Ω) of protective resistor 12 is enormously greater than inner resistance rc of piezoelectric element 5 and ON-resistors r1 and r2 of transistors 8, 9, 10 and 11. Accordingly, only resistance value R of protective resistor 12 is realistically considered to be related to the driving speed.

Piezoelectric element 5 receives electric charges from power supply 2 through electrode 5a or 5b, and also receives opposite electric charges from the grounded point through opposite electrode 5b or 5a. At this time, the current of the applied electric charge (being the electrical current), to be charged to electrodes 5a and 5b, generates Joule heat in protective resistor 12, ON-resistor r1 of transistor 8 or 10, ON-resistor r2 of transistor 11 or 9, and inner resistor rc of piezoelectric element 5.

In the RC circuit, in which a capacitor and a resistor are connected in series, energy of $1/2CVp^2$ (J) is accumulated in piezoelectric element 5, and the charging current to charge piezoelectric element 5 generates heat of $1/2CVp^2$(J), being equal to the accumulated energy, in resistors R, r1, r2 and rc. In the same way as in the case of charging, energy accumulated in piezoelectric element 5 is consumed in resistors R, r1, r2 and rc, so that the heat is generated during the discharge. That is, resistors R, r1, r2 and rc transform energy of $1/2CVp^2$ (J) to heat, in proportion to the ratios of the resistors, whenever transistors 8, 9, 10 and 11 are switched.

Due to this phenomenon, in order to reduce heat generated in transistors 8, 9, 10, and 11, resistance value R of protective resistor 12 is increased. Specifically, in order to control heat generation in transistors 8, 9, 10 and 11 to be less than one half, resistance value R of protective resistor 12 is increased to be greater than the sum (r1+r2) of the resistor values of transistors 8 and 11, or of transistors 9 and 11, which are simultaneously effective among transistors 8, 9, 10, and 11.

In driver 1 of the present embodiment, in order to switch between transistors 8 and 11 and transistors 9 and 10, a short phase can be used in which transistors 8 and 10, serving as two charging switching elements, are simultaneously deactivated, while transistors 9 and 11, serving as two discharging switching elements, are simultaneously activated, whereby electrodes 5a and 5b of piezoelectric element 5 are short-circuited.

Due to the short phase, some percentage of the electrical charges, (being one half as the maximum case) accumulated in one electrode, are conveyed to the other electrode through protective resistor 12 and transistors 9 and 11, whereby consumption of the electrical power in power supply 2 can be reduced. Further in this short phase, Joule dissipation of the electrical current, caused by the charging and discharging operations, can be mostly generated in protective resistor 12, so that any heat generated in transistors 9 and 11 are reduced.

In the present embodiment, protective resistor 12 is provided on a cable run between transistors 8 and 9 and electrode 5a. The same effect will be obtained if protective resistor 12 is provided on a cable run (being point A in FIG. 1) between transistors 10 and 11 and electrode 5b. Further, in case that the short phase is not provided, protective resistor 12 can be provided on a cable run (being point B in FIG. 1) between transistors 8 and 10 and power supply 2, or on a cable run (being point C in FIG. 1) between transistors 9 and 11 and the grounded point. Still further, plural divided resistors, being made by dividing protective resistor 12 into plural sections, can be arranged on these cable runs.

Figure 3:
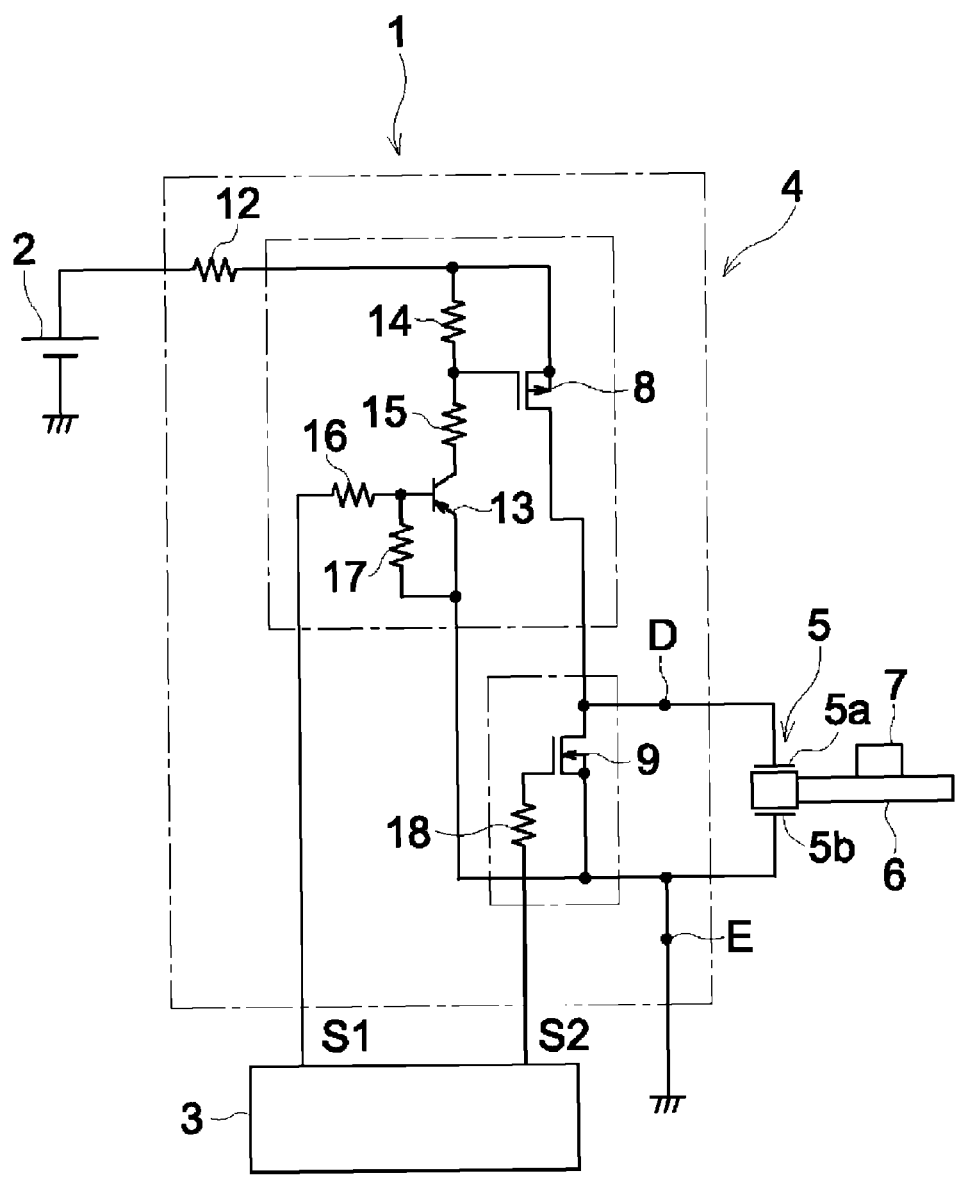
FIG. 3 is a circuit diagram of the driver in a Second Embodiment of the present invention.

Still further, driver 1 of the Second Embodiment of the present invention will now be detailed, while referring to FIG. 3. In the present Embodiment, the same number is applied to the same elements as in the First Embodiment, so that the explanation is omitted. Driver 4 of the present Embodiment includes transistor 8, serving as one of the charge switching element, and transistor 9, serving as one of the discharge switching element, whereby electrode 5a of piezoelectric element 5 is connected to power source 2 or to the grounded point, and electrode 5b is always grounded, which forms the half-bridge circuit.

In order to make transistor 8 to switch by the small input current, bipolar transistor 13 and resistors 14, 15, 16, 17 and 18 are employed in the present Embodiment. However, transistor 8 is activated or deactivated by control signal S1, and transistor 9 is activated or deactivated by control signal S2, which is the same way as in the first Embodiment.

Still further, in the present Embodiment, the heat generated due to the charging and discharging operation of piezoelectric element 5, is controlled to be divided based on the ratio of resistance value of protective resistor 12, whereby piezoelectric element 5 and transistors 8 and 9 are prevented from being over-heated.

Protective resistor 12, of the present Embodiment, can be provided on the cable run (which is point D) between transistors 8 and 9 and electrode 5a, or on the cable run (being point E) between electrode 5b and the grounded point.

In the present Embodiment, if piezoelectric element 5 is secured to a body of a lens unit, and a lens is supported by frictionally coupling member 7, a lens driving structure, employing an element securing method, is formed. Further, if piezoelectric element 5 is secured to a moving stage, and frictionally coupling member 7 is secured to the body, a self-advancing stage driving structure is formed, in which driving member 6 and piezoelectric element 5 are driven against frictionally coupling member 7 (that is, frictionally coupling member 7 moves relatively to slide against driving member 6), so that the moving stage is driven.

What is claimed is:
1. A driver, comprising:
a piezoelectric element extending and contracting upon application of an electrical voltage;
a driving member having one end secured to the piezoelectric element, and being able to reciprocate in an axial direction by a extending and contracting movement of the piezoelectric element;
a frictionally coupling member, frictionally coupling the driving member and being caused to slide against the driving member by reciprocating movement of the driving member; and
a drive circuit connected with a power supply and applying a voltage generated by the power supply to the piezoelectric element at a predetermined drive period, wherein the drive circuit includes:
a charge switching element for connecting an electrode of the piezoelectric element with the power supply,
a discharge switching element for grounding the electrode of the piezoelectric element, and
a protective resistor arranged in at least either an electric path between the power supply and the piezoelectric element or an electric path between the piezoelectric element and a ground point,
wherein a resistance value of the protective resistor is set larger than an ON resistance of the switching element but smaller than a value obtained by dividing one half of the drive period of the switching element by a capacitance of the piezoelectric element.
2. The driver of claim 1, wherein the protective resistor is arranged in plural positions which are the electric path between the power supply and the piezoelectric element, and the electric path between the piezoelectric element and the ground point.

3. The driver of claim 1, wherein the drive circuit comprises a full-bridge circuit to select the electrode of the piezoelectric element to apply the voltage generated by the power supply.

4. The driver of claim 3, wherein the protective resistor is arranged in at least either the electric path between the charge switching element and the piezoelectric element or the electric path between the discharge switching element and the piezoelectric element.

5. The driver of claim 1, wherein the drive circuit includes:
two charge switching elements to connect the electrode of the piezoelectric element with the power supply; and
two discharge switching elements to connect the electrode of the piezoelectric element with the ground,
wherein when the drive circuit switches the piezoelectric element between a charging operation and a discharging operation, the drive circuit simultaneously makes the two charge switching elements to be non-conduction states, and simultaneously makes the two discharge switching elements to be conduction states, for a predetermined period.

* * * * *